Jan. 25, 1966   M. CALTHORPE   3,231,161
VEHICLE LUGGAGE RACK WITH TENT FRAME
Filed March 4, 1964   2 Sheets-Sheet 1
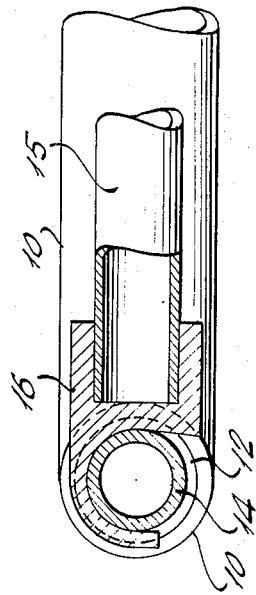
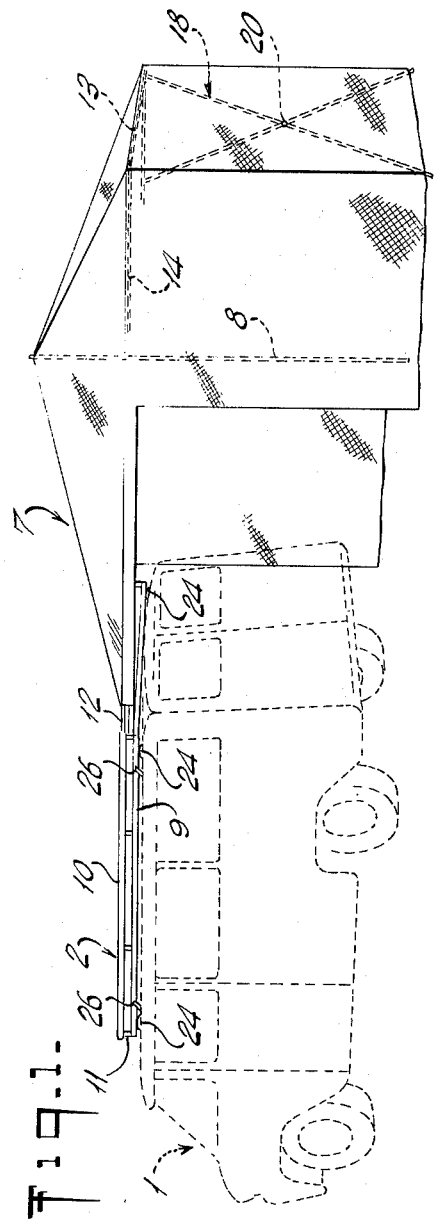
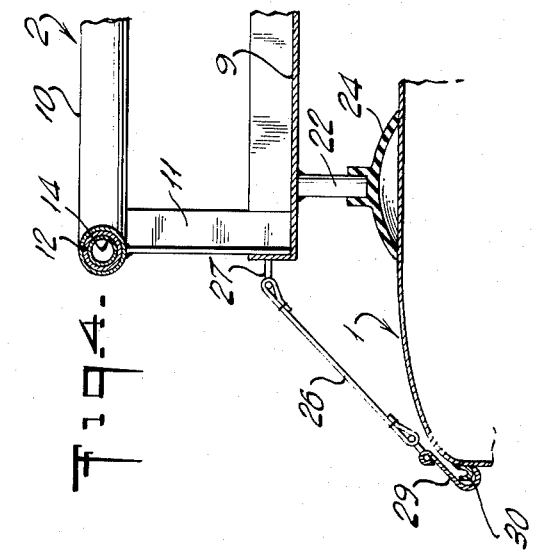
INVENTOR
MAURICE CALTHORPE
BY
Nolte & Nolte
ATTORNEYS Jan. 25, 1966    M. CALTHORPE    3,231,161
VEHICLE LUGGAGE RACK WITH TENT FRAME
Filed March 4, 1964    2 Sheets-Sheet 2
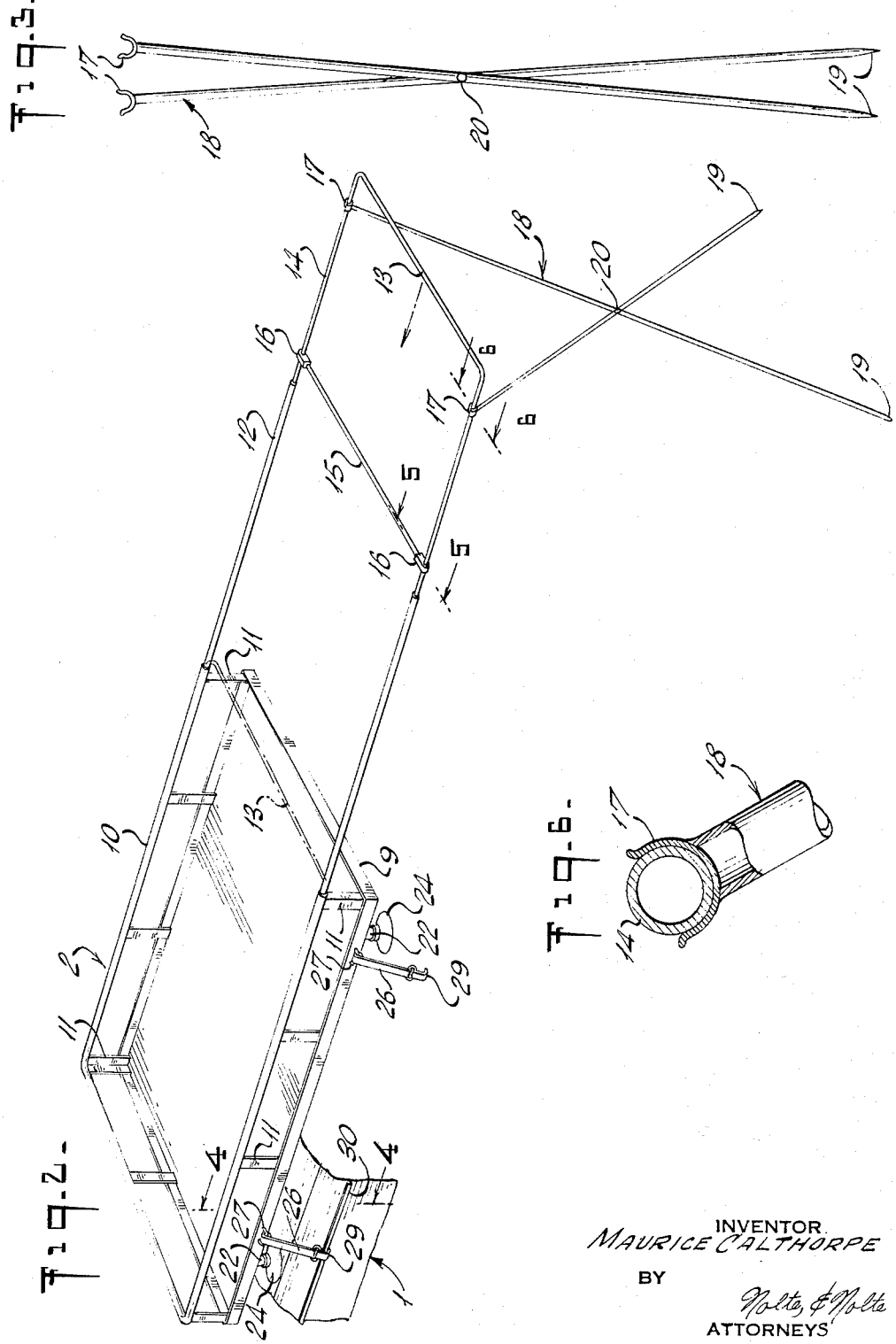
INVENTOR.
MAURICE CALTHORPE
BY
Nolte, & Nolte
ATTORNEYS

3,231,161
VEHICLE LUGGAGE RACK WITH TENT FRAME
Maurice Calthorpe, 369 Oakridge Road,
Los Altos Hills, Calif.
Filed Mar. 4, 1964, Ser. No. 349,277
1 Claim. (Cl. 224—42.1)

This invention relates to a portable camping shelter adapted to be used with automobiles or other vehicles. More particularly, this invention relates to a portable structure that may be carried on the top of a vehicle and may be extended therefrom to form a frame around which a shelter for one or more persons may be quickly established.

The situation frequently arises wherein individuals on a camping trip desire a quick and convenient type of shelter. A tent that can be conveniently carried in an automobile or truck and quickly set up is of great convenience to many campers. However, in the past, the structures required to support such tents were bulky and cumbersome so that only small and uncomfortable shelters could conveniently be carried.

It is therefore an object of this invention to provide a new and improved portable structure adapted to be fitted to the top of an automobile for use with a tent or similar shelter.

It is a further object of this invention to provide a lightweight frame for a shelter that may be rapidly and simply set up by a camper.

Another object of the invention is to provide a superior shelter; one that will withstand the elements more readily than previous prior art devices.

In the drawings:

FIG. 1 illustrates an automobile and a tent in its constructed position about the frame;

FIG. 2 illustrates a luggage rack and the portable structure in both the retracted and extended positions;

FIG. 3 illustrates the vertical support of the structure;

FIG. 4 is a view along line 4—4 of FIG. 2;

FIG. 5 is a view along line 5—5 of FIG. 2; and

FIG. 6 is a view along line 6—6 of FIG. 2.

Briefly, in accordance with the principles of this invention, a portable structure for a tent or other shelter may be positioned within a luggage rack. The structure includes telescoping tubes that may be readily extended and a separate detachable X-shaped pivot bar that may be connected to the tubes for additional vertical support. A tent may then be placed in position around the extended frame.

Referring now to FIG. 1, there is illustrated an automobile shown generally as 1 and a luggage rack 2 connected thereto. A tent 7 is shown as having been constructed about the extended frame.

Referring now to FIG. 2, there is shown a luggage rack 2 on top of vehicle 1, comprising a base 9 and an upper railing 10 supported on the base 9 by vertical supports 11. As shown in the drawing, railing 10 is a hollow tube adapted to receive slidable tubes 12 and the legs 14 of a U-shaped member, said legs being connected by a cross bar 13 which may be integral therewith, which can be telescoped into one another. When all of the tubes are telescoped into one another the resulting luggage rack is shown with cross bar 13 as an end rail member thereof, as shown in dot and dash lines in FIG. 2.

For additional lateral support a crossbar 15 may be slidably positioned on legs 14 by means of brackets 16 positioned at each end of the crossbar 15. In this manner crossbar 15 will slide towards the end of legs 14 when the latter are telescoped into tube 12 and the brackets 16 strike the ends of the railing 10. When the U-shaped member is extended, crossbar 15 may then be manually moved down to any desired position.

For vertical support a removable pivot bar shown as 18 may be propped under tube 14 by means of U-brackets 17. In FIG. 3, the removable pivot bar 18 is shown closed around pivot 20. The U-shaped brackets 17 may be propped under tube 14 while the pronged ends 19 are inserted into the ground.

FIG. 4 illustrates in detail the manner in which the luggage rack may be supported on the automobile 1. Vertical supports 22 positioned at each corner of the rack 2 are inserted into suction cups 24 which are attached to the top of the vehicle. Straps or their equivalent 26 are attached at their ends to prongs 27 on the luggage rack and on their other ends to S-shaped brackets 29 which in turn are hooked under the drip gutters 30 on either side of the roof of the vehicle 1.

FIG. 5 is a detailed drawing of the crossbar 15 and the manner in which it may be attached to legs 14. As shown, crossbar 15 is inserted into a bracket 16 which hooks over and is slidably positioned over legs 14. In this manner bar 15 may be positioned at any desired point when the frame is extended, and when legs 14 are telescoped into tube 12, the crossbar will move to the extreme end, as previously described, or if desired, the entire bracket and the crossbar may be removed from the frame by simple lifting action.

FIG. 6 shows how the U-shaped bracket 17 of pivot bar 18 may be positioned under a leg 14 of the frame when vertical support is desired.

When the frame is extended and the vertical support 18 placed in postion, a tent may be arrayed about it in any desired manner. One example shown in FIG. 1 illustrates a center pole 8 inserted in the ground and the tent attached thereto. Of course, many different types of tents may be employed and the invention should not be limited to any single form.

Whereas a preferred embodiment of the invention has been shown and described, it should be obvious to those skilled in the art that various changes may be made in the form of the invention without affecting the scope thereof.

I claim:

A luggage rack for a vehicle comprising means for attaching the luggage rack to said vehicle, vertical support means on said luggage rack, an elevated rail supported by said vertical support means and encompassing the luggage rack and including a pair of mutually spaced parallel tubular members, a pair of additional tubular members telescoped into said parallel tubular members, a U-shaped member having legs telescoped respectively into said additional tubular members and including a cross bar serving as part of the rail, when said legs are telescoped into said additional tubular members and said additional tubular members are telescoped into said parallel tubular members of said rail, a cross member extending between and slidably carried by said legs of said U-shaped member for shiftable movement therealong when they are telescoped out of said additional tubular members so as to reinforce the resulting framework, said cross member engaging the ends of said additional tubular members which are nearest to said cross bar of said U-shaped member when said legs thereof are telescoped into said additional tubular members so that said cross member becomes located automatically alongside of said cross bar when the legs of said U-shaped member are telescoped into said additional tubular members, a pair of pivoted elongated members each having a fitting at its upper end for engaging the legs of the U-shaped member and supporting the same when said legs thereof are moved out of said additional tubular members, and a center pole separate from all of the other elements of the luggage rack and adapted to support a tent at a central portion thereof while the remainder of the tent is supported on the additional tubular members and U-shaped member.

References Cited by the Examiner

UNITED STATES PATENTS

| | | |
|---|---|---|
| 2,395,173 | 2/1946 | Dobler. |
| 2,621,836 | 12/1952 | McMiller. |
| 2,870,774 | 1/1959 | Blosser. |

FOREIGN PATENTS

| | | |
|---|---|---|
| 220,998 | 4/1959 | Australia. |
| 541,257 | 3/1956 | Italy. |
| 95,334 | 1/1960 | Norway. |

GERALD M. FORLENZA, *Primary Examiner.*

HUGO O. SCHULZ, *Examiner.*

J. E. OLDS, *Assistant Examiner.*